United States Patent
Yakobson et al.

(10) Patent No.: US 7,683,006 B2
(45) Date of Patent: *Mar. 23, 2010

(54) METHOD FOR ACTIVATING AN IRON-BASED FISCHER-TROPSCH CATALYST

(75) Inventors: Dennis L. Yakobson, Arvada, CO (US); Elijah C. Philipp, Westminster, CO (US); Mark S. Bohn, Golden, CO (US)

(73) Assignee: Rentech, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/412,779

(22) Filed: Mar. 27, 2009

(65) Prior Publication Data

US 2009/0227448 A1   Sep. 10, 2009

Related U.S. Application Data

(62) Division of application No. 11/456,962, filed on Jul. 12, 2006, now Pat. No. 7,544,719.

(51) Int. Cl.
*B01J 23/745* (2006.01)
*C07C 27/06* (2006.01)

(52) U.S. Cl. .......... 502/338; 518/719; 518/720

(58) Field of Classification Search ......... 502/338; 518/719, 720
See application file for complete search history.

(56) References Cited

U.S. PATENT DOCUMENTS

| | | | | |
|---|---|---|---|---|
| 5,504,118 A | * | 4/1996 | Benham et al. | 518/719 |
| 6,838,487 B1 | * | 1/2005 | Demirel et al. | 518/710 |
| 7,544,719 B2 | * | 6/2009 | Yakobson et al. | 518/720 |

* cited by examiner

*Primary Examiner*—Timothy C Vanoy
*Assistant Examiner*—Daniel Berns
(74) *Attorney, Agent, or Firm*—Conley Rose, P.C.

(57) ABSTRACT

A method for transforming at least a part of the catalyst precursor hematite into x-carbide ($Fe_5C_2$) and $\epsilon'$-carbide ($FeC_{2.2}$) without a large amount of fines generation. This method slows the transformation of the hematite to iron carbides by reducing the partial pressure of the synthesis gas by inert gas dilution. The activation time is about three to about five hours.

10 Claims, 5 Drawing Sheets

METHOD FOR ACTIVATING AN IRON-BASED FISCHER-TROPSCH CATALYST

CROSS-REFERENCE TO RELATED APPLICATIONS

This application is a divisional of U.S. patent application Ser. No. 11/456,962 filed Jul. 12, 2006, the disclosure of which is hereby incorporated herein by reference.

STATEMENT REGARDING FEDERALLY SPONSORED RESEARCH OR DEVELOPMENT

N/A.

FIELD OF ART

The present method relates to the activation of an unsupported iron-based Fischer-Tropsch (FT) catalyst, and more particularly to reducing breakup of catalyst particles caused by the transformation of an iron oxide precursor such as hematite to iron carbides when the hematite is exposed to synthesis gas.

BACKGROUND

The Fischer-Tropsch reaction can be written for each carbon number n as:

$$(2n+x)H_2 + nCO \rightarrow C_nH_{2(n+x)} + nH_2O, \qquad (1)$$

where x=0 and n>1 for olefins,
and x=1 and n≧1 for paraffins.

For an iron-based catalyst, activation of the Fischer-Tropsch reaction also activates the water gas shift reaction:

$$H_2O + CO \leftrightarrow H_2 + CO_2 \qquad (2)$$

The term "activation" of an iron-based FT catalyst refers to the transformation of an inert catalyst precursor such as hematite into a composition and structure that causes the reaction between hydrogen and carbon monoxide to take place at a high rate to produce predominantly hydrocarbons having more than five carbon atoms. Activation can be carried out as a one-step or two step method. In the two step method, the hematite is first reduced to $Fe_2O_3$, FeO or elemental iron using hydrogen before exposing the catalyst to either carbon monoxide or a mixture of carbon monoxide and hydrogen (synthesis gas). In the single step method the catalyst is exposed to synthesis gas without a pre-reduction step. When synthesis gas is used for activating the catalyst, the Fischer-Tropsch reaction rate increases as the carbiding reactions convert an increasing amount of oxide to carbides. This method of activating the catalyst is sometimes referred to as "induction." A short intense activation period, which exposes a catalyst to synthesis gas for about 3 hours, is sometimes referred to as "typhoon induction."

An iron-based catalyst that exhibits high activity for reactions (1) and (2) typically contains iron carbides including Hägg carbide ($Fe_5C_2$) and ε'-carbide ($Fe_{2.2}C$). Iron carbides are formed by reacting iron or iron oxide with gases containing carbon monoxide at elevated temperatures. In the paper by Li et al., "Spectroscopic and Transient Kinetic Studies of Site Requirements in Iron-Catalyzed Fischer-Tropsch Synthesis", J. Phys. Chem. B 2002, 106, 85-91, the authors describe the structural changes that take place with time when the catalyst precursor hematite is subjected to synthesis gas at a temperature of 523 K. From data obtained in situ on Fischer-Tropsch synthesis, Li et al. indicated that hematite, $Fe_2O_3$, is rapidly reduced to magnetite, $Fe_3O_4$, and the $Fe_3O_4$ is rapidly carburized. Since the skeletal density of the carbides is about 7.7 g/cm³ compared to 5.2 for $Fe_3O_4$, the carbide crystallites would occur in patches on the $Fe_3O_4$ core.

The carbon number distribution for the Fischer-Tropsch reaction is often characterized using the Anderson-Schultz-Flory distribution which relates successive moles of hydrocarbon as:

$$N_n = \alpha N_{n-1} \qquad (3)$$

where $N_n$ is the number of moles of hydrocarbon having n carbon atoms and α is a constant. Using successive substitutions, the moles at any carbon number n can be related to the number of moles of methane (n−1):

$$N_n = \alpha^{n-1} N_1. \qquad (4)$$

In reality, the carbon number distribution for an iron-based catalyst typically cannot be represented using a single value for alpha (α). At low carbon numbers, alpha values are smaller than the alpha values at high carbon numbers. However, obtaining alpha values from gas and liquid product analyses is difficult and time-consuming. Therefore, it is useful to calculate a single alpha from the data as an indicator of selectivity. For single alpha values of about 0.75 or less, very little wax, defined as hydrocarbons having 20 or more carbon atoms, is produced, whereas for single alpha values greater than about 0.85, wax is the predominant hydrocarbon product. Single alpha values can be calculated from gas chromatograph data for the inlet and outlet gas streams of the FT reactor. This technique is described in C. B. Benham, "Data analysis procedures in Fischer-Tropsch synthesis," ACS Div. Fuel Chem. Prepr., 40(1), 1995, pp 201-202.

A useful relationship can be obtained relating single alpha to total CO conversion using the following variables:

$y = 1/(1-\epsilon)$ where ε denotes total CO conversion, and  (5)

$z = 1/(1-\alpha)$.  (6)

The following equation relates z to y and gas composition:

$$z = \sqrt{\{((1+G_{CO2})y - R_{CO2} - 1)/(R_{CH4} - G_{CH4}y))\}} \qquad (7)$$

where $G_{CO2}$ and $G_{CH4}$ are the ratios of moles of $CO_2$ and $CH_4$ to the moles of CO in the inlet gases and $R_{CO2}$ and $R_{CH4}$ are the ratios of moles of $CO_2$ and $CH_4$ to the moles of CO in the outlet gases, respectively. From equation (6), the single alpha is related to z by:

$$\alpha = 1 - 1/z. \qquad (8)$$

Therefore, from measured values of CO conversion and chromatograph data for the FT inlet and tail gases, one can determine the single alpha value as used hereinafter.

An especially effective activating procedure is described in U.S. Pat. No. 5,504,118 which issued to C. B. Benham et al., and which teaches a method of producing a catalyst having high activity and selectivity for producing predominantly hydrocarbon containing products having more than five carbon atoms. As disclosed in Example 2 of the '118 patent, the catalyst precursor is subjected to synthesis gas having a $H_2$:CO ratio of about 1.4 at a temperature of about 280° C., at a pressure of about 150 psig, and at a space velocity of about 4 Nl/h/g Fe. The activation time was about 2 hours. The resulting catalyst exhibited high activity, high wax selectivity, and high stability. Due to the short intense typhoon activation, catalyst fines can be produced due to the rapid transformation of the crystallites from iron oxide to iron carbides. Fine catalyst particles, which can be carried over into the separated wax, can cause problems in downstream separation equipment. A new method is disclosed, which reduces generation of fine catalyst particles during activation while maintaining the activity, selectivity and stability of the catalyst described in the '118 patent. The '118 catalyst performance is used as a baseline for comparing the performance of catalysts activated using the instant method. The single alpha and CO conversion values for the baseline catalyst were about 0.85 and about 80%, respectively, under the operating conditions of the tests described hereinbelow.

SUMMARY OF THE DISCLOSURE

In accordance with the present disclosure, breakup of catalyst particles caused by the transformation of the iron oxide precursor (hematite) to iron carbides during exposure to synthesis gas is reduced. According to the disclosed method, the addition of a large amount of an inert gas to the synthesis gas decreases the amount of fines generated. For example, the amount of inert gas should typically be about three to about four times the amount of synthesis gas. The addition of inert gas serves to reduce the partial pressure of the synthesis gas used for activation. Therefore, an unsupported precipitated iron-based catalyst comprising copper and potassium promoters is activated such that the amount of fines produced is reduced below the amount produced in the '118 patent while at the same time maintaining the activity, selectivity and stability of that disclosed in the '118 patent. The term "fines" means catalyst fragments generally having a largest dimension less than about 10 microns. The term "unsupported" means an absence of any material other than copper or potassium in the catalyst that would add strength to the catalyst particles or inhibit sintering of the iron crystallites in the catalyst.

As further discussed below, the catalyst is activated using a $H_2$:CO ratio of about 1.4. For operating conditions, the $H_2$:CO ratio may be adjusted in accordance with run parameters. For example, the ratio can be varied from about 0.7 to about 2 depending upon the source of the synthesis gas. In general, lower $H_2$:CO ratios give higher alpha values and higher $H_2$:CO ratios give lower alpha values.

Figure 1:
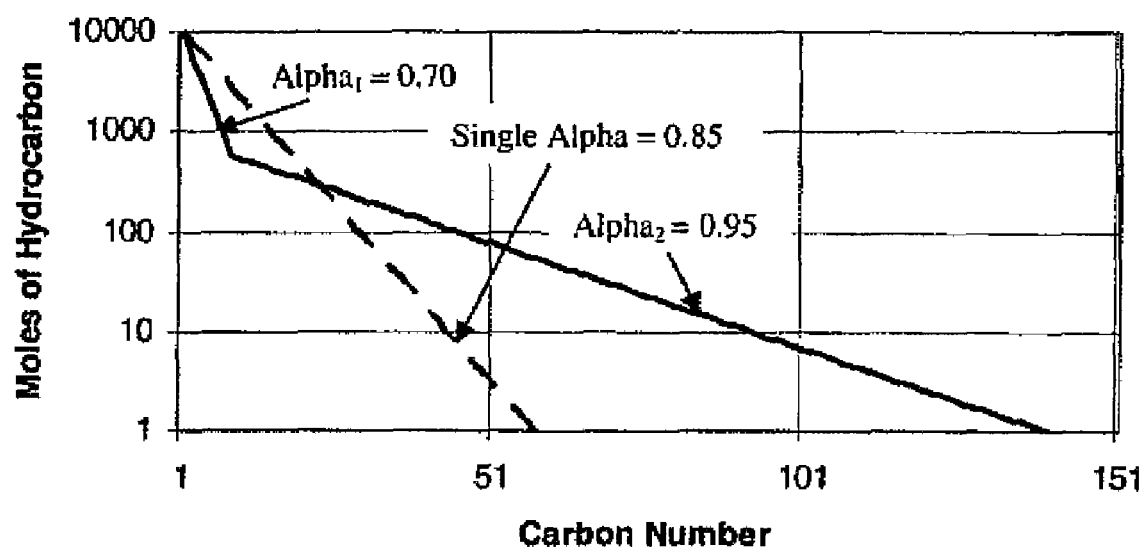
FIG. 1 is a graphical depiction of the carbon number distributions for a dual alpha case and a single alpha case wherein the amount of carbon contained in the hydrocarbons is the same.
Figure 2:
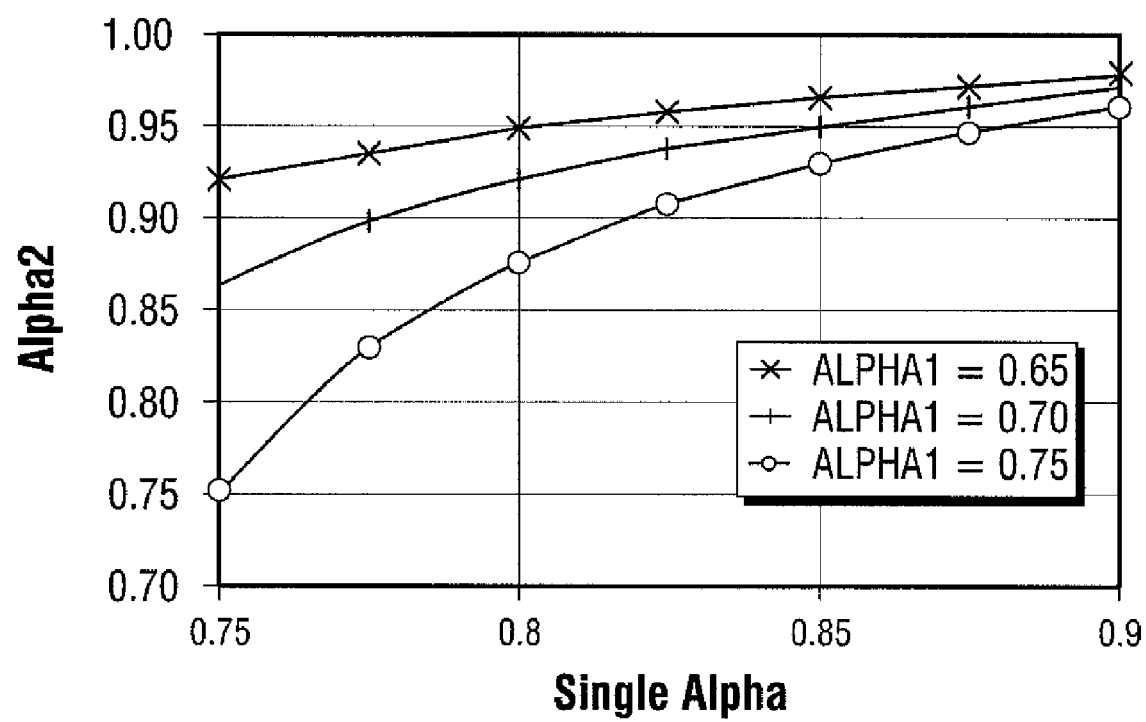
FIG. 2 is a graphical depiction of the relationship between the second alpha of a dual alpha carbon number distribution and the alpha of a single alpha carbon number distribution.

Before explaining the disclosed embodiments in detail, it is to be understood that the embodiments are not limited in application to the details of the particular arrangements shown, since other embodiments are possible. Also, the terminology used herein is for the purpose of description and not of limitation. The embodiments and features are described and illustrated in conjunction with systems, tools and methods which are meant to exemplify and to illustrate, not be limiting in scope.

DESCRIPTION OF THE DISCLOSED EMBODIMENTS

An unsupported precipitated iron-based catalyst, useful for carrying out the Fischer-Tropsch reaction in a slurry bubble column reactor, is activated by the disclosed method, which significantly reduces the amount of fines generated during the activation process when compared to the amount of fines generated in the activation procedures of previous methods. It has been found surprisingly that the time required for activation under the disclosed method is only about three to about five hours. The examples described hereinbelow illustrate the efficacy of the disclosed method.

The term "space velocity" as used herein is the number of normal liters per hour of combined $H_2$ and CO flowing per gram of catalyst precursor (Nl/h/g cat). The term "normal" is based on one atmosphere of pressure and a temperature of 0° C. As used herein, unless otherwise noted the term "alpha" will refer to single alpha.

Test Procedure

One kilogram of air-classified precipitated iron-based catalyst precursor (predominantly hematite) promoted with copper and potassium was mixed with 3.9 kilograms of the slurry medium comprising hydrocarbon or wax and loaded into a three-phase bubble column reactor. During ramp to induction, nitrogen flow was increased from about 5 nlpm to about 19 nlpm. The nitrogen was used to suspend the catalyst precursor particles while the temperature was increased to about 270° C. and the pressure was increased to about 160 psia (about 1.1 MPaa). The gas mixture for inducting the catalyst precursor was introduced into the reactor to replace the nitrogen used for the heating and pressurization step. The molar ratio of hydrogen to carbon monoxide was set to about 1.4 for all tests described hereinbelow. Temperature was controlled at about 270° C. over the slurry height by a combination of external electrical heaters and an internal cooling tube. Data was collected during the induction to determine total carbon monoxide conversion and a single alpha value as described above. For particle size analysis, samples were taken of the initial catalyst precursor material and of the slurry after each induction phase was completed. After induction, ran conditions were established by increasing the pressure to about 410 psia (about 2.8 MPaa) and lowering the temperature to about 255° C.

In the examples presented hereinbelow, the catalyst precursor was spray dried unsupported precipitated iron having a particle size distribution ranging from about 15 microns to about 100 microns. The catalyst was promoted with about 1% by weight copper and about 1% by weight potassium as potassium carbonate.

For Run No. 75 as described in Example 1, Dussek Campbell No. 6471 paraffin wax (Dussek Campbell Inc., National Wax Division, Skokie, Ill.) was used as the slurry medium. For Examples 2, 3 and 4, the liquid Durasyn®164 polyalphaolefins (Amoco Chemical Co., Chicago, Ill.) was used to simplify catalyst sample preparation for particle size analysis.

The examples are presented herein to show various possible embodiments and should not be construed as a limitation of all the possibilities. For example, in the described runs, the ratio of hydrogen to carbon monoxide is about 1.4:1. In addition, the ratio of inert gas to the sum of hydrogen and carbon monoxide is between about 3.3 and about 3.5. Not only may the ratios be modified to achieve optimization of the disclosed method, but inert gases other than nitrogen such as natural gas and methane may also be employed. In the disclosed method, a reactor temperature between about 270° C. and about 280° C. is maintained. Reactor pressure is maintained between about 140 psia (0.97 MPaa) and about 160 psia (1.1 MPaa). The space velocity (SV) is between about 0.2 and about 0.3 Nl/h/g cat. A spray dryer may be used to remove most of the water from the catalyst and at the same time to produce roughly spherical catalyst particles having diameters in the range of about 20 to about 100 microns. See FIG. 3.

EXAMPLE 1

Run 75 was conducted to establish baseline performance for the typhoon induction procedure. This typhoon induction procedure differs from that described in the '118 patent in that a temperature of about 270° C. was used instead of 280° C. Also the space velocity (SV) was reduced in Run 75 to about 1.18 from that specified in the '118 patent of about 2.6. No particle size samples were taken in this run. The procedure was run for an induction period or time on stream (TOS) of about three hours and for an additional twenty four hours under standard operating (run) conditions. The results for Run 75I (induction phase) and Run 75R (operation phase) are shown below in Table 1. Alpha values for the induction and operation phases are shown to be about 0.84 and about 0.85, respectively. The CO conversion values for the induction and operation phases are shown to be about 92% and about 88%, respectively.

EXAMPLE 2

Figure 3:
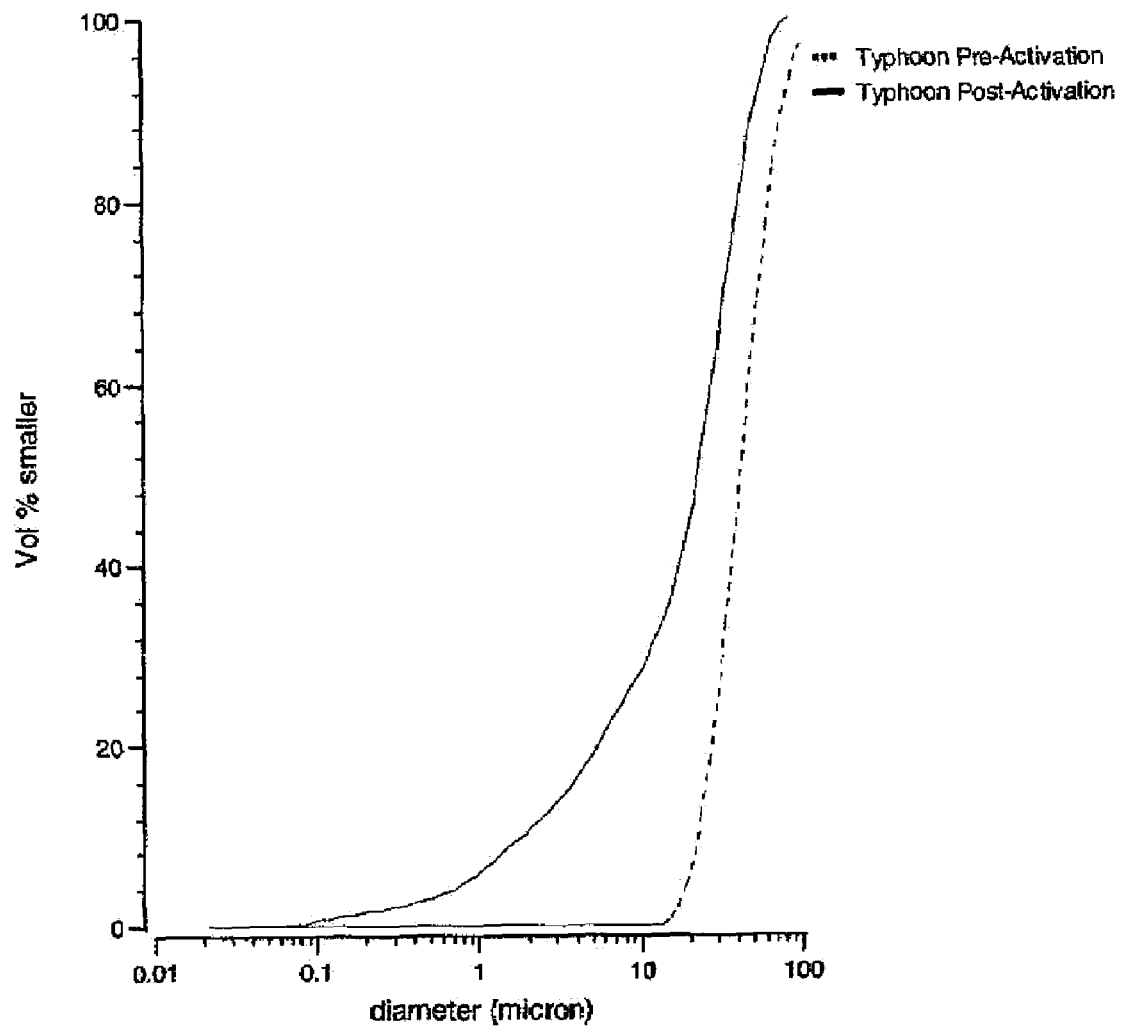
FIG. 3 is a graphical depiction of a cumulative percentage of catalyst particles versus particle diameter before and after "typhoon induction." After typhoon induction, approximately 30% of the particles are less than about 10μ. in diameter.

Because no particle size samples were taken in Run 75, the induction phase of Example I was repeated. Run 80I was conducted using the same induction parameters as the typhoon induction phase of Run 75I. Run 80I was allowed to proceed for about a three-hour induction period. Data for this run are shown below in Table 1. Cumulative particle sizes for the catalyst before and after induction are shown in FIG. 3. The typhoon induction resulted in the generation of about 30% particles smaller than about 10μ. The alpha value is shown to be about 0.83, and the CO conversion is shown to be about 89% at the end of induction.

EXAMPLE 3

Figure 4:
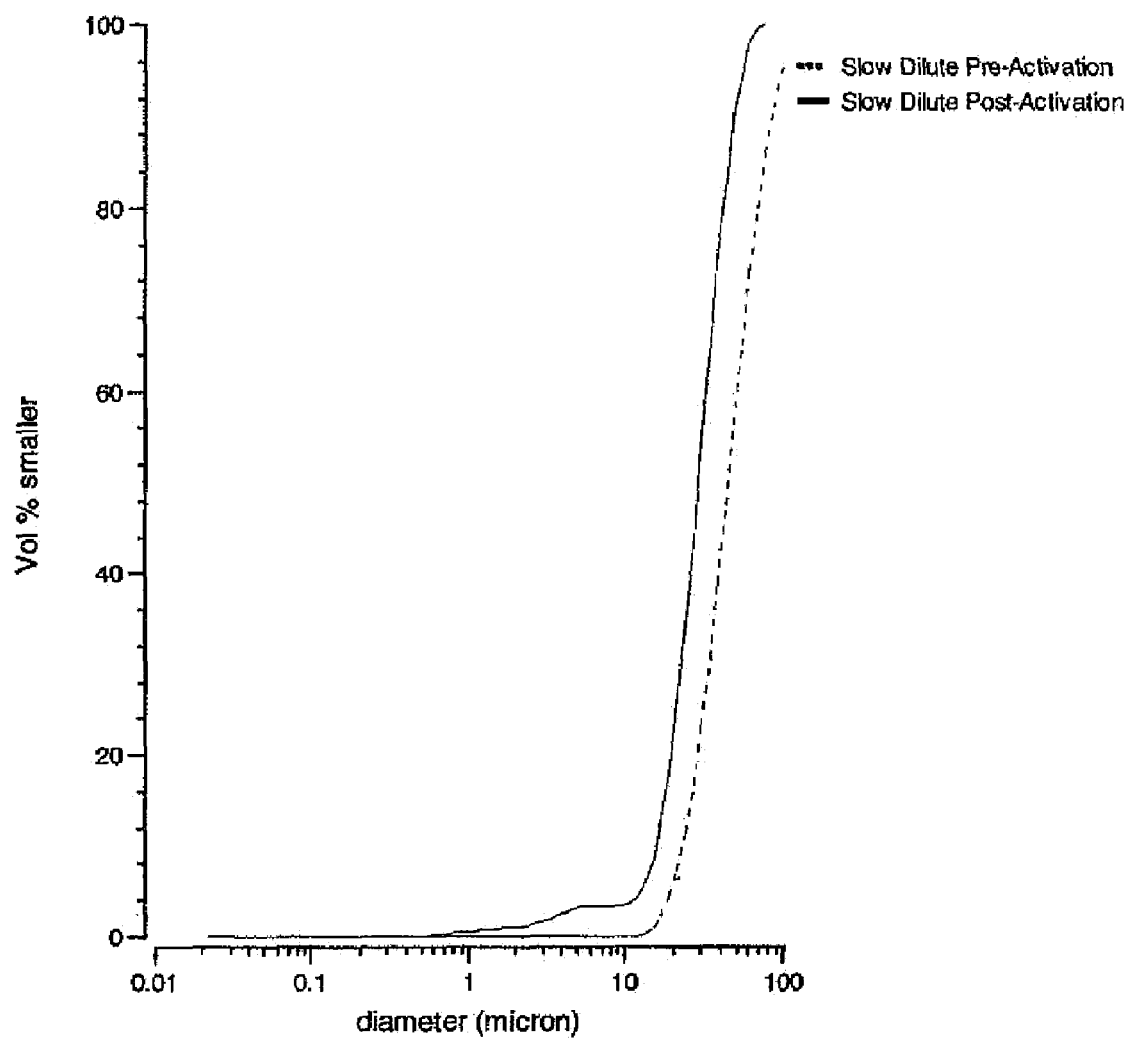
FIG. 4 is a graphical depiction of a cumulative percentage of catalyst particles versus particle diameter before and after a long dilute induction.

In Run 81, the partial pressures of hydrogen and carbon monoxide were reduced by a factor of about 4.5 by diluting the gas with nitrogen during the induction period. To compensate for the lower partial pressures of activating gases, the induction time was extended to about 14.5 hours. Thus, the induction is deemed to be a long (or slow) dilute. Consequently the same cumulative number of moles of synthesis gas passes through the reactor during induction. As can be seen in Table 1, the alpha value was very low at the end of the induction period. After about 24 hours of operation, the carbon monoxide conversion had increased to a very high level of about 98%, but alpha had improved to only about 0.78. The particle size plot of FIG. 4 shows that there was generation of some particles smaller than about 10μ, about 4%, which indicates a reduction in catalyst attrition occurred because of a nitrogen dilution of the syngas. The reduction in catalyst attrition may be considered significant when comparing a generation of about 30% particles smaller than about 10μ as set forth in the previous example.

EXAMPLE 4

Figure 5:
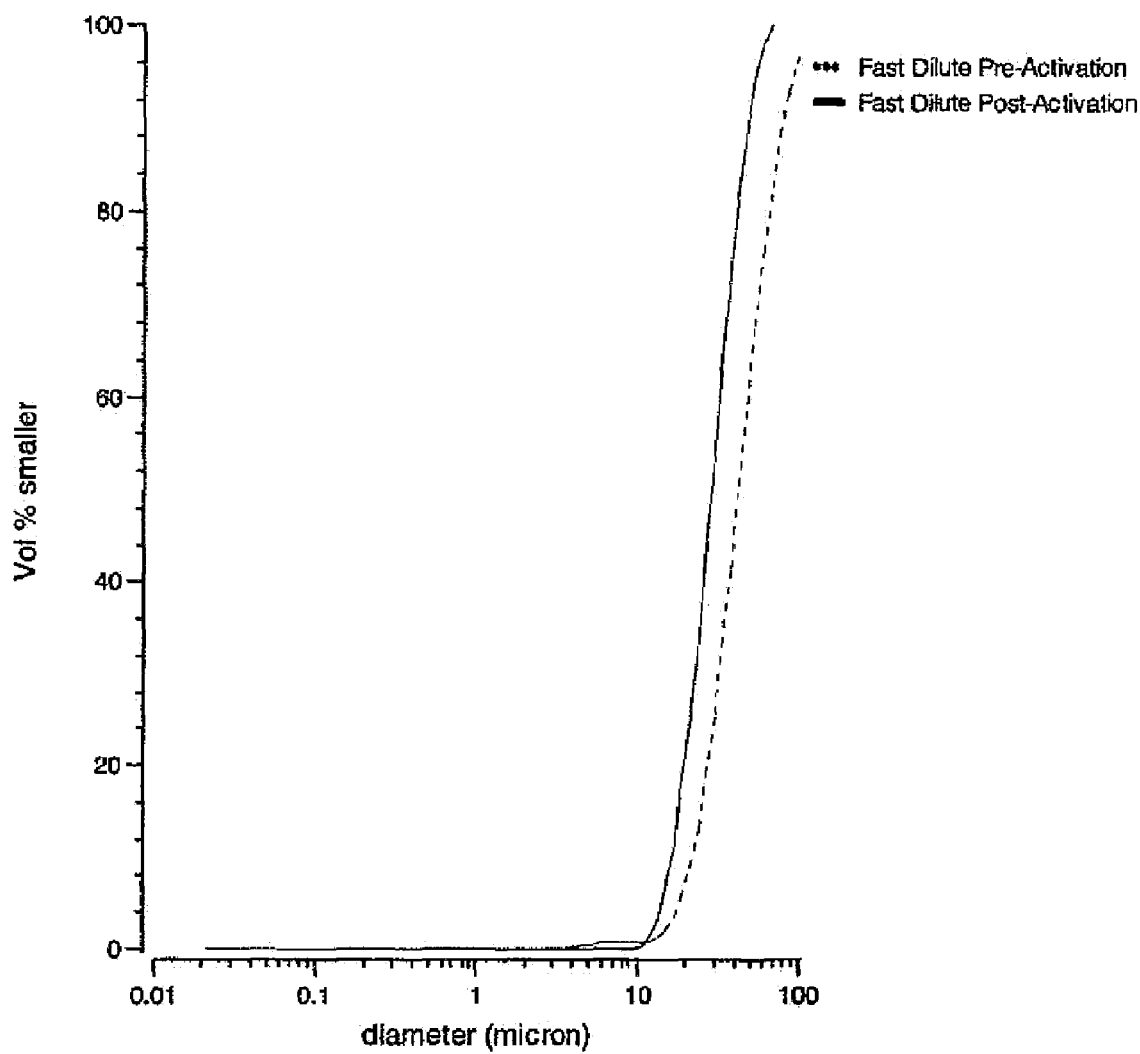
FIG. 5 is a graphical depiction of a cumulative percentage of catalyst particles versus particle diameter before and after a short dilute induction.

Because an excessive induction time could potentially affect alpha values negatively, Example 3 was repeated to determine the effect on activity and selectively when a shorter induction time is employed. During the induction period of Run 82, the partial pressures of hydrogen, carbon monoxide, and nitrogen from Run 81 were maintained, but the induction time was reduced to about three hours. As can be seen in Table 1, the CO conversion and alpha at the end of induction were very low compared to the typhoon induction values. Surprisingly, however, after about 24 hours of operation, alpha and carbon monoxide conversion had both attained acceptable values signifying high selectivity and high activity of the resulting catalyst. Specifically, alpha is shown to be in the same range (about 0.85) as that generated after typical typhoon induction runs. Moreover, as shown in FIG. 5, there were almost no particles smaller than about 10μ in the slurry sample taken at the end of induction, which signifies that an even greater reduction in catalyst attrition occurred as a result of a short duration nitrogen dilution of the syngas.

TABLE 1

| Run No. | Inlet Partial Pressure (Psia) | | | Temp. (° C.) | SV (Nl/h/g cat) | Induction Type | TOS (h) | $\alpha$ | CO Conv. (Fract) | % PSD less than ~10 μ |
|---|---|---|---|---|---|---|---|---|---|---|
| | $H_2$ | CO | $N_2$ | | | | | | | |
| 75 I | 95 | 68 | 0 | 270 | 1.18 | Typhoon | 3.0 | 0.84 | 0.92 | N/A |
| 75 R | 238 | 170 | 0 | 255 | 2.16 | — | 24 | 0.85 | 0.88 | |
| 80 I | 95 | 68 | 0 | 270 | 1.18 | Typhoon | 3.1 | 0.83 | 0.89 | 30 |
| 81 I | 21 | 15 | 126 | 270 | 0.26 | Long Dilute | 14.5 | 0.67 | 0.86 | 4 |
| 81 R | 240 | 171 | 0 | 255 | 2.16 | — | 24 | 0.78 | 0.98 | |
| 82 I | 20 | 14 | 126 | 270 | 0.26 | Short Dilute | 3.0 | 0.69 | 0.66 | 0 |
| 82 R | 239 | 171 | 0 | 255 | 2.16 | — | 24 | 0.85 | 0.89 | |

As set forth in the disclosure of the '118 patent, the activity and selectivity of a FT catalyst is improved if the catalyst is subjected to a hydrogen-rich synthesis gas at elevated temperature and pressure. During a ramping up stage, the hydrogen-rich synthesis gas was used in lieu of an inert gas for maintaining the catalyst in suspension while the slurry is being heated to approximately 200° C. This procedure was used to conserve inert gas at the same time that synthesis gas was being flared and would not affect the catalyst at the lower temperatures. The synthesis gas was then replaced by an inert gas (nitrogen or carbon dioxide) until the activation temperature was attained at which time activation was carried out using synthesis gas. In the present method, during activation, the inert gas combines with the synthesis gas, whereby activation is carried out using diluted synthesis gas.

As taught by the '118 patent, the presence of a large amount (20%) by volume of nitrogen in the synthesis gas used for pretreatment of the catalyst had no detrimental effect on the activation procedure. The time for activation of the catalyst remained at two hours in the presence of about 20% nitrogen. In the present method, not only does the use of a much larger amount of nitrogen have no detrimental effect on the activation procedure, the inert gas aids in reducing breakup of catalyst particles which are exposed to synthesis gas.

In the disclosed embodiments, a precipitated iron-based catalyst is employed. It is expected however, that any of the catalysts which favor reaction (2) and undergo large density changes during activation can be used effectively in the present method. The iron based catalysts described hereinbefore are utilized due to their low cost.

Although the activation is shown to take place in the FT reactor, it is conceivable that a process may utilize a separate activation vessel wherein the catalyst could be transferred to the FT reactor.

While a number of exemplifying features and embodiments have been discussed above, those of skill in the art will recognize certain modifications, permutations, additions and subcombinations thereof. No limitation with respect to the specific embodiments disclosed herein is intended or should be inferred.

We claim:

1. A method for reducing a generation of fine catalyst particles during activation of an iron-based catalyst precursor, said method comprising the steps of:
   providing a slurry comprising an iron-based catalyst precursor in a liquid medium;
   exposing said iron-based catalyst precursor to a synthesis gas comprising hydrogen and carbon monoxide for a predetermined activation; and
   diluting said synthesis gas with an inert gas during said activation period, thereby forming an inducting environment wherein catalyst fines caused by the transformation of iron oxides to iron carbides is reduced,
   wherein an amount of said inert gas ranges from about 3 to about 4 times an amount of said synthesis gas.

2. The method of claim 1, further comprising the step of utilizing an activated catalyst at a temperature of about 255° C., a pressure of about 410 psia (about 2.8 MPaa), a space velocity of about 2.6 Nl/h/g cat, and a H2:CO ratio of about 0.7 to about 2, to achieve an activity in the range of 85% to 90% carbon monoxide conversion.

3. The method of claim 1, further comprising the step of utilizing an activated catalyst at a temperature of about 255° C., a pressure of about 410 psia (about 2.8 MPaa), a space velocity of about 2.6 Nl/h/g cat, and a H2:CO ratio of about 0.7 to about 2, to achieve a selectivity in the range of 0.83 to 0.85.

4. The method of claim 1, wherein the inert gas is selected from the group consisting of nitrogen, methane, and natural gas.

5. The method of claim 1, wherein the iron-based catalyst precursor is unsupported.

6. A method for activating an iron-based catalyst precursor without a large amount of fines generation, the method comprising the steps of:
   providing a Fischer-Tropsch slurry comprising iron-based catalyst precursor comprising hematite in a liquid medium;
   exposing said iron-based catalyst precursor to a synthesis gas comprising hydrogen and carbon monoxide for a predetermined activation period; and
   slowing the transformation of the hematite in the iron-based catalyst precursor to iron carbides by reducing the partial pressure of the synthesis gas by inert gas dilution,
   wherein a ratio of dilution gas to a sum of hydrogen and carbon monoxide ranges from about 3 to about 4.

7. The method of claim 6, wherein said activation period is about three to about five hours.

8. The method of claim 6, wherein said hematite catalyst precursor comprises copper and potassium promoters.

9. The method of claim 6, wherein the dilution gas is selected from the group consisting of nitrogen, methane, and natural gas.

10. The method of claim 6, wherein fines comprise catalyst fragments generally having a largest dimension less than about 10 microns.

* * * * *